United States Patent [19]

Hiraiwa

[11] Patent Number: 4,653,348
[45] Date of Patent: Mar. 31, 1987

[54] PLANETARY GEAR TRAIN FOR AUTOMATIC TRANSMISSION

[75] Inventor: Kazuyoshi Hiraiwa, Atsugi City, Japan

[73] Assignee: Nissan Motor Company, Limited, Yokohama, Japan

[21] Appl. No.: 717,048

[22] Filed: Mar. 28, 1985

[30] Foreign Application Priority Data

Mar. 30, 1984 [JP] Japan .................... 59-60989

[51] Int. Cl.$^4$ ............................ F16H 57/10
[52] U.S. Cl. ...................... 74/759; 74/763
[58] Field of Search ............... 74/758, 759, 762, 763, 74/764, 765, 753

[56] References Cited

U.S. PATENT DOCUMENTS

| 3,282,131 | 11/1966 | Smith | 74/758 |
| 3,483,771 | 12/1969 | Forster et al. | 74/763 X |
| 3,503,282 | 3/1970 | Peterson | 74/759 |
| 3,575,067 | 4/1971 | Hermann | 74/759 |
| 3,812,739 | 5/1974 | Mori et al. | 74/763 |
| 3,823,622 | 7/1974 | Mori et al. | 74/759 |
| 3,999,448 | 12/1976 | Murakami et al. | 74/759 |

FOREIGN PATENT DOCUMENTS

| 1530584 | 7/1970 | Fed. Rep. of Germany . |
| 2160606 | 8/1972 | Fed. Rep. of Germany . |
| 0121259 | 10/1984 | Fed. Rep. of Germany . |
| 3507600 | 9/1985 | Fed. Rep. of Germany . |
| 1536080 | 12/1978 | United Kingdom . |

OTHER PUBLICATIONS

Auto-Mechanis, Second Edition, Herbert E. Ellinger, Chapter 23, pp. 352 and 353.

Primary Examiner—Leslie Braun
Assistant Examiner—Martin G. Belisario
Attorney, Agent, or Firm—Schwartz, Jeffery, Schwaab, Mack, Blumenthal & Evans

[57] ABSTRACT

The planetary gear train comprises first and second planetary gear sets. One of the planetary gear sets has a ring gear which is always connected to an input shaft. The first planetary gear set can be locked by a first clutch. A second clutch selectively connects the sun gears of both planetary gear sets. A third clutch selectively connects the first planetary gear set with the pinion carrier of the second planetary gear set. A fourth clutch selectively connects a pinion carrier of the first planetary with a ring gear of the second planetary gear set.

16 Claims, 18 Drawing Figures

|  |  | C1 | C2 | C3 | C4 | B1 | B2 | OWC 1 | OWC 2 |
|---|---|---|---|---|---|---|---|---|---|
| D-RANGE | 1 |  |  | ○ |  |  |  | ○ | ○ |
|  | 2 |  |  | ○ |  | ○ |  | ○ |  |
|  | 3 |  |  | ○ | ○ |  |  | ○ |  |
|  | 4 |  |  |  | ○ | ○ |  |  |  |
| L-RANGE | 1 | ○ |  |  |  |  | ○ |  |  |
|  | 2 | ○ |  |  |  | ○ |  |  |  |
|  | REV. |  | ○ |  |  |  | ○ |  |  |

| | C 34 | C 36 | C 38 | C 40 | B 42 | B 44 | RATIO | $\alpha_1 = 0.48$ $\alpha_2 = 0.36$ |
|---|---|---|---|---|---|---|---|---|
| 1 | | ○ | | ○ | | ○ | $1 + \alpha_1 + \alpha_1/\alpha_2$ | 2.813 |
| 2 | | ○ | | ○ | ○ | | $1 + \alpha_1$ | 1.480 |
| 3 | ○ | | (○) | ○ | | | 1 | 1.000 |
| 4 | ○ | | ○ | | ○ | | $1/(1+\alpha_2)$ | 0.735 |
| REV. | ○ | ○ | | | | ○ | $-1/\alpha_2$ | -2.778 |

| | C 34 | C 36 | C 38 | C 40 | C 62 | B 42 | B 44 | O/C 52 | O/C 64 | O/C 50 | RATIO | $\alpha_1 = 0.45$<br>$\alpha_2 = \alpha_3 = 0.4$ |
|---|---|---|---|---|---|---|---|---|---|---|---|---|
| D-RANGE 1 | | | | ○ | | | | ○ | ○ | ○ | $(1+\alpha_1+\alpha_1/\alpha_2)(1+\alpha_3)$ | 3.605 |
| D-RANGE 2 | ○ | | | ○ | | ○ | | ○ | ○ | ○ | $(1+\alpha_1)(1+\alpha_3)$ | 2.030 |
| D-RANGE 3 | ○ | | | ○ | | ⊚ | | ○ | | ○ | $1+\alpha_3$ | 1.400 |
| D-RANGE 4 | ○ | | ○ | | | ○ | | ○ | | | 1 | 1.000 |
| D-RANGE 5 | | | ○ | | ○ | | | | | | $(1+\alpha_3)/(1+\alpha_2+\alpha_3)$ | 0.778 |
| REV. | ○ | | | | ○ | | ○ | | | | $-(1+\alpha_3)/\alpha_2$ | -3.500 |
| L-RANGE 1 | | ○ | | ○ | ○ | | ○ | | | | | |
| L-RANGE 2 | ○ | ○ | | ○ | ○ | | ○ | | | | | |
| L-RANGE 3 | ○ | | ○ | ○ | ○ | | | | | | | |
| L-RANGE 4 | | | ○ | ○ | ○ | | | | | | | |
| 2′ D | | | | ○ | ○ | ○ | | ○ | | | $\dfrac{(1+\alpha_1)(1+\alpha_2)(1+\alpha_3)}{1+\alpha_2+\alpha_3}$ | 1.579 |
| 2′ L | | ○ | | ○ | ○ | ○ | | | | | | |
| 3′ D | | | ○ | ○ | ○ | ○ | | ○ | | | $\dfrac{(1+\alpha_1)(1+\alpha_3)}{1+\alpha_2+\alpha_3}$ | 1.128 |
| 3′ L | | ○ | ○ | ○ | ○ | ○ | | | | | | |

FIG.17

| | C 34 | C 36 | C 38 | C 40 | C 62 | B 42 | B 44 | O/C 52 | O/C 64 | O/C 50 | RATIO | $\alpha_1 = 0.45$<br>$\alpha_2 = 0.4$<br>$\alpha_3 = 0.6$ |
|---|---|---|---|---|---|---|---|---|---|---|---|---|
| D-RANGE 1 | | | | | | | | ○ | ○ | ○ | $(1+\alpha_1+\alpha_1/\alpha_2)\left(\dfrac{1+\alpha_3}{\alpha_3}\right)$ | 6.867 |
| D-RANGE 2 | | | | ○ | | ○ | | ○ | | ○ | $(1+\alpha_1)\left(\dfrac{1+\alpha_3}{\alpha_3}\right)$ | 3.867 |
| D-RANGE 3 | ○ | | | ○ | | (○) | | | | ○ | $\dfrac{1+\alpha_3}{\alpha_3}$ | 2.667 |
| D-RANGE 4 | | | | ○ | ○ | ○ | | ○ | | | $\dfrac{(1+\alpha_1)(1+\alpha_2)(1+\alpha_3)}{1+\alpha_3+\alpha_2\cdot\alpha_3}$ | 1.765 |
| D-RANGE 5 | ○ | | ○ | | ○ | ○ | | ○ | | | $\dfrac{(1+\alpha_1)(1+\alpha_3)}{1+\alpha_3+\alpha_2\cdot\alpha_3}$ | 1.261 |
| D-RANGE 6 | ○ | | ○ | | ○ | | | ○ | | | $1$ | 1.000 |
| D-RANGE 7 | ○ | | ○ | | ○ | | | | | | $\dfrac{1+\alpha_3}{1+\alpha_3+\alpha_2\cdot\alpha_3}$ | 0.870 |
| REV. | | ○ | | | ○ | ○ | | | | | $-\dfrac{1+\alpha_3}{\alpha_2\cdot\alpha_3}$ | −6.607 |
| L-RANGE 1 | | ○ | | ○ | | | ○ | | | | | |
| L-RANGE 2 | | ○ | | ○ | | | ○ | | | | | |
| L-RANGE 3 | ○ | | | ○ | | | ○ | | | | | |
| L-RANGE 4 | | | | ○ | | ○ | ○ | | | | | |
| L-RANGE 5 | | ○ | | | ○ | ○ | | | | | | |
| L-RANGE 6 | ○ | ○ | | | ○ | ○ | | | | | | |

FIG.18

PLANETARY GEAR TRAIN FOR AUTOMATIC TRANSMISSION

BACKGROUND OF THE INVENTION

The present invention relates to a planetary gear train for an automatic transmission.

Figure 1:
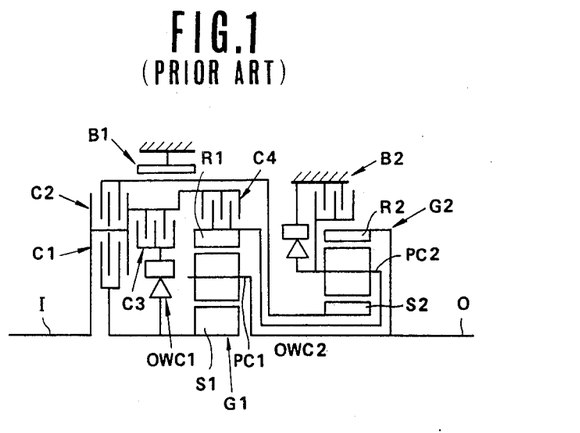
FIG. 1 shows in schematic form a known planetary gear train discussed above.
Figure 2:
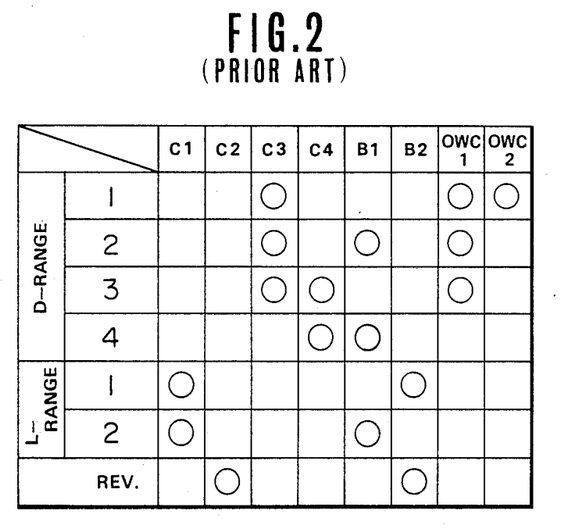
FIG. 2 is a chart showing the clutch and brake engagement-and-release pattern for the planetary gear train shown in FIG. 1.

FIG. 1 shows a known planetary gear train manufactured by General Motors in United States. The planetary gear train comprises two planetary gear sets G1, G2, four clutches, C1, C2, C3, C4, two brakes B1, B2, and two one-way clutches OWC1, OWC2. A first sun gear S1 is selectively connected with an input shaft I via the clutch C3 and the one-way clutch OWC1, a first ring gear R1 is connected with a second pinion carrier PC2, a first pinion carrier PC1 is connected with a second ring gear R2 and also with an output shaft O, the first ring gear R1 is selectively connected with the input shaft I via the clutch C4, a second sun gear S2 is seletively connected with the input shaft I via the clutch C2, the first sun gear S1 is selectively connected with the input shaft I via the clutch C1, the second sun gear S2 is adapted to be achored by the brake B1, the second carrier PC2 is adapted to be anchored by the brake B2 and the one-way clutch OWC2 prevents reverse rotation of the second pinion carrier PC2. The friction devices C1 to C4, B1, B2, OWC1, and OWC2 are engaged or released according to a pattern shown in FIG. 2 to establish four speeds during D-range, one reverse speed and two speeds during L-range.

The above planetary gear train, however, is encountered with problems as follows. The first problem is that the stress of each tooth of the sun gears S1 and S2 is large so the allowable upper limit of the input torque is low. This is attibuted to the fact that the sun gears have the smallest diameters among all planetary rotary elements, and the input shaft I drives the first sun gear S1 via the clutch C3 and the one-way clutch OWC1 in first, second and third speeds, and it drives the second sun gear S2 via the clutch C2 in the reverse drive. The second problem is that the sun gear S1 rotates at about 2.5 times the rotation of the input shaft I in fourth speed, so that the strength of a member that is connected with this sun gear S1 has to be increased accordingly and this member requires a bearing construction that has a long endurability. The third and last problem is that a portion of the rotation fed to the planetary gear set G1 from the input shaft circulates between the two planetary gear sets G1, G2, causing a drop in transmission effeciency of the power and besides, this arrangement is not preferrable from the standpoint of endurability of the planetary gear sets.

SUMMARY OF THE INVENTION

An object of the present invention is to provide a planetary gear train for an automatic transmission which is free from the above mentioned problems.

Another object of the present invention is to provide a planetary gear train for an automatic transmission which provides four forward speeds but may be easily modified to another planetary gear train providing more than four forward speeds.

Still another object of the present invention is to provide a planetary gear train for an automatic transmission including clutch means for locking a first planetary gear set, another clutch means for connecting the first planetary gear set with a pinion carrier of a second planetary gear set and brake means for anchoring a sun gear of the second planetary gear set so that these clutch means and brake means coact with each other to provide a power delivery path in at least one speed in forward drive.

Still another object of the present invention is to improve the typical three speed Simpson gear train such that at least one overdrive speed is added with maintaining the three power delivery paths provided by the Simpson gear train.

According to the present invention, there is provided a planetary gear train comprising:
   a first planetary gear set having rotary elements including a first sun gear, a first ring gear and a first pinion carrier rotatably supporting a plurality of first pinions meshing with said first sun gear and said first ring gear;
   a second planetary gear set having rotary elements including a second sun gear, a second ring gear and a second pinion carrier rotatably supporting a plurality of second pinions meshing with said second sun gear and said second ring gear;
   an input shaft drivingly connected with said first ring gear;
   an output shaft;
   first drive connection establishing means for connecting said second ring gear with said output shaft;
   a first clutch means for selectively locking said first planetary gear set;
   second drive connection establishing means for selectively interconnecting said first and second planetary gear sets, said second drive connection establishing means includes,
   a second clutch means for selectively connecting said first sun gear with said second sun gear,
   a third clutch means for selectively connecting said first planetary gear set with said second pinion carrier, and
   a fourth clutch means for selectively connecting said first pinion carrier with said second ring gear; and
   reaction providing means for selectively providing a reaction to at least one of said rotary elements.

DETAILED DESCRIPTION OF THE EMBODIMENTS

Figure 3:
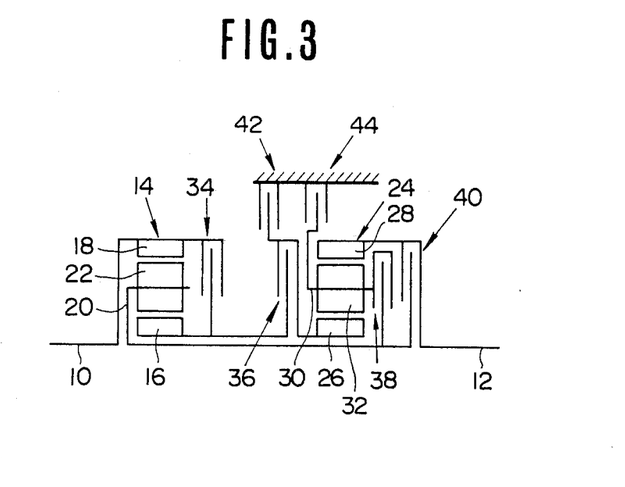
FIG. 3 shows in schematic form a first embodiment of a planetary gear train according to the present invention.
Figure 4:
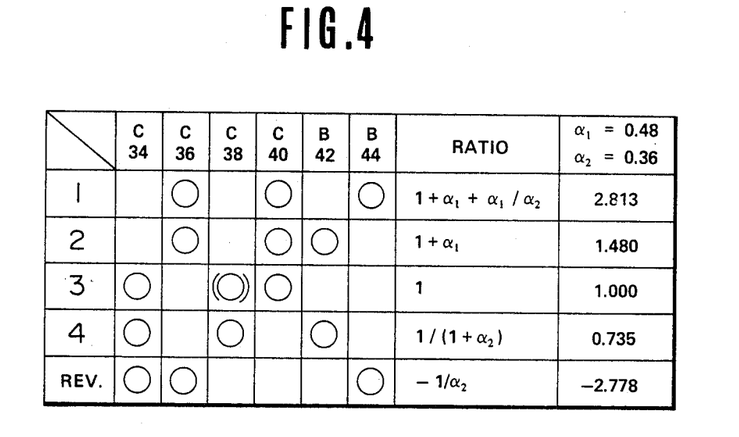
FIG. 4 is a chart showing the clutch and brake engagement-and-release pattern for the planetary gear train shown in FIG. 3.

Referring to FIGS. 3 and 4, a first embodiment of a planetary gear train according to the present invention is described. As shown in FIG. 3, the planetary gear train comprises an input shaft 10, an output shaft 12, a first planetary gear set 14 including a first sun gear 16, a first ring gear 18 and a first pinion carrier 20 rotatably carrying a plurality of first pinions 22 meshing with the sun and ring gears 16 and 18, and a second planetary gear set 24 including a second sun gear 26, a second ring gear 28 and a second pinion carrier 30 rotatably carrying a plurality of second pinions 32 meshing with the second sun and ring gears 26 and 28.

The first ring gear 18 is constantly connected with the input shaft 10 so that the rotation of the input shaft 10 always causes the rotation of the first ring gear 18. A first friction clutch 34 is provided which selectively connects the first sun gear 16 with the first ring gear 18. Since, when it is engaged, the first planetary gear set 14 is locked to rotate in unison with the input shaft 10, this clutch 34 serves as a lock-up clutch. A second friction clutch 36 selectively connects the first sun gear 16 with the second sun gear 26. Since, when in operation, this second clutch 36 is engaged in first, second and reverse speeds as readily understood from FIG. 4, the first and second sun gears 16 and 26 are interconnected in these speeds. A third friction clutch 38 selectively connects the first pinion carrier 20 with the second pinion carrier 30. A fourth friction clutch 40 selectively connects the first pinion carrier 20 with the second ring gear 28 which is constantly connected with the output shaft 12. A first brake 42 selectively anchors the second sun gear 26. A second brake 44 selectively anchors the the second pinion carrier 30.

The friction devices including the clutches 34, 36, 38 and 40, and brakes 42 and 44 are selectively engaged or released in accordance with a pattern shown in FIG. 4, thus providing four forward speeds and one reverse. Referring to FIG. 4, a ratio of the number of teeth of the first sun gear 16 to the number of teeth of the first ring gear 18 is denoted by $\alpha_1$ and a ratio of the number of teeth of the second sun gear 26 to the number of teeth of the second ring gear 28 is denoted by $\alpha_2$. The corresponding gear ratios are calculated on the assumption that $\alpha_1=0.48$ and $\alpha_2=0.36$. The sign "o+ denotes a friction device to be engaged so it plays a role in establishing a power delivery path in the corresponding speed, the sign (o) denotes a friction device held engaged although it does nothing to do with a power delivery path to be established in the corresponding speed.

As will be readily understood from FIGS. 3 and 4, the planetary gear train operates basically in the same manner as the typical Simpson gear train does in first, second and third speeds. The analogy between the gear train shown in FIG. 3 and the well known Simpson gear train is proved by the fact that the clutch 34, brake 44 and brake 42 correspond to a high & reverse clutch, a low & reverse brake and an intermediate brake employed by the Simpson gear train, respectively.

In first speed, the input shaft 10 drives the first ring gear 18 in a forward direction, which is the same direction as the engine (not shown) rotates. Since the fourth clutch 40 is engaged, the first pinion carrier 20 is connected to the output shaft 12 which, in turn, is connected to wheels (not shown) of the automotive vehicle so it resists movement. Forward rotation of the first ring gear 18 causes the first sun gear 16 to rotate backward, which is opposite to engine rotation. Since the second clutch 36 is engaged, the first sun gear 16 is connected to the second sun gear 26, so the second sun gear 26 turns backward to drive the second planetary gear set 24. The second ring gear 28, as well as the first pinion carrier 20, is connected to the output shaft 12 so the second sun gear 26 rotating in the reverse direction tries to move the second pinion carrier 30 in the reverse direction. This is prevented because the second pinion carrier 30 is anchored by the second brake 44. With the second pinion carrier 30 anchored, the reverse rotating sun gear 26 forces the second ring gear 28 forward, producing maximum gear reduction.

In second speed, the first ring gear 18 is driven with the second and fourth clutches 36 and 40 still engaged, but the first sun gear 16 is anchored by the first brake 42. The first ring gear 18 pulls the first pinion carrier 20 forward. The first pinion carrier 20 is connected to the output shaft 12 so the output shaft 12 moves forward in reduction through the first planetary gear set 14.

In third speed (direct drive), the first clutch 34 is engaged to drive the first ring and sun gear 18 and 16 at the same soeed as the input shaft 10 rotates. This causes the first pinion carrier 20 to rotate at the same speed as the input shaft 10 rotates. The first pinion carrier 16 is connected to the output shaft 12 by the fourth clutch 40 so output shaft speed equals the driving speed of the input shaft 10.

In fourth speed, both of clutches 34 and 38 are engaged to directly connect the input shaft 10 with the second pinion carrier 30, and the brake 42 is applied to anchor the second sun gear 26. This causes the second ring gear 28 and the integral output shaft 12 to rotate at a speed higher than the rotation of the input shaft 10. Thus, the fourth speed gives overdrive.

In reverse, the clutches 34 and 36 are both engaged and the brake 44 is applied to provide the substantially the same power flow path as the Simpson gear train does.

In the gear train shown in FIG. 3, the input shaft 10 drives the first ring gear 18 in each of first, second and third speeds, and in fourth speed, the first planetary gear set 14 rotating as driving rotation of the input shaft 10 drives the second pinion carrier 30. As a result, since the rotation of the input shaft 10 is fed to the ring gear or the pinion carrier which has a relatively large diameter as compared to the sun gear, the stress to which each of the planetary rotary elements is subjected to is small as compared to the known planetary gear train shown in FIG. 3 where the rotation of the input shaft was fed to the sun gear.

Even though the rotation of the input shaft 10 is fed to the second sun gear 26 in reverse, it has least influence on the life of each of the planetary rotary elements because the operating time in reverse is very short.

In the gear train shown in FIG. 3, even though the second ring gear 28 and output shaft 12 rotate at a speed higher than the rotation of the input shaft 10 in fourth speed, there is no gear which will rotate at a speed higher than the rotation of the input shaft 10. This may be understood from the following explanation regarding nomograms shown in FIGS. 5 to 9, respectively.

Referring to FIGS. 5 to 9, each of these nomograms shows the relationship among rotational speeds of the rotary elements of each planetary gear set. Assuming for each planetary gear set that the rotational speed of a ring gear is $N_R$, that of a pinion carrier $N_{PC}$, and that of a sun gear $N_S$ and also assuming that the ratio of the member of teeth of sun gear to that of ring gear is $\alpha$, the relationship can be expressed by an equation as follows:

$$N_R + \alpha \times N_S - (1+\alpha) \times N_{PC} = 0.$$

Thus, axes of ordinate for ring gear, pinion carrier and sun gear are arranged so that the ratio of the distance between the axis for ring gear and the axis for planetary carrier to the distance between the axis for pinion carrier and the axis for sun gear is $\alpha$. If any straight line is drawn in this ordinate intersecting all of the axes, the intersections with the axes represent rotational speeds of ring gear, pinion carrier and sun gear, respectively, because these rotational speeds satisfy the above equation. It is to be noted that if two planetary gear sets are combined to form a planetary gear train, the axes for the interconnected rotary elements are arranged on the same place and represented by the common axis.

Figure 5:
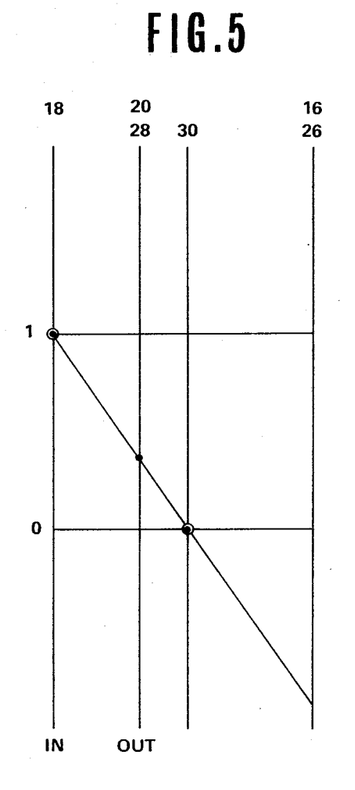
FIGS. 5 to 9 are nomograms showing the relationship among rotational speeds of the planetary rotary elements for four forward and one reverse speeds, respectively.
Figure 6:
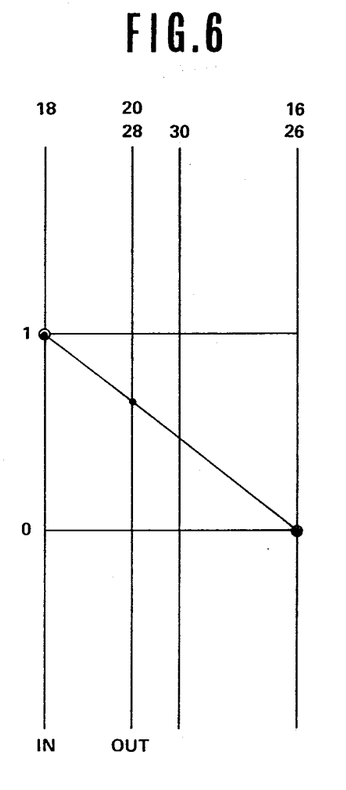
Figure 7:
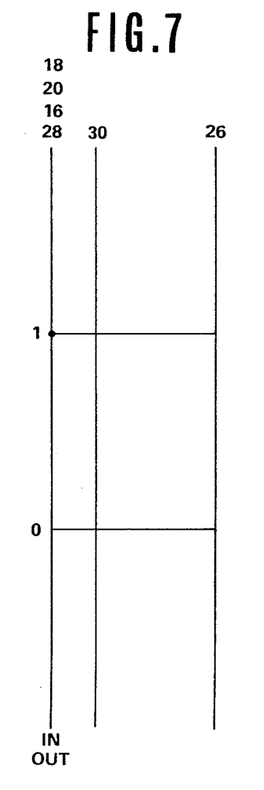
Figure 8:
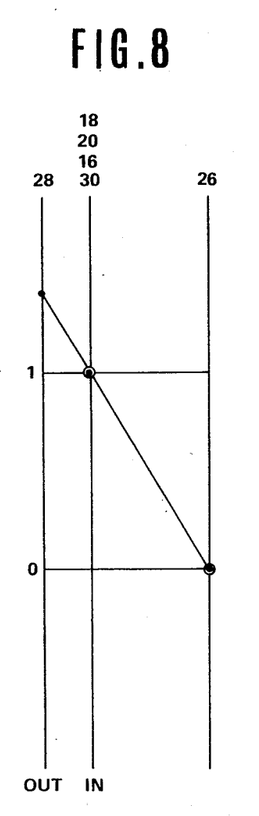
Figure 9:
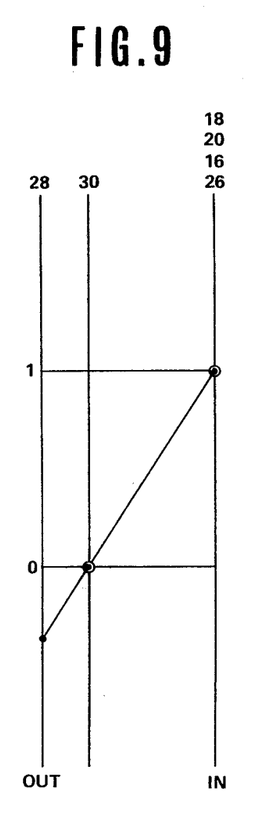

FIG. 5 shows the relationship between the rotational speeds of the rotary elements of the first and second planetary gear sets 14 and 24 to be established in first speed. Referring to FIG. 5, since the second pinion carrier 30 is anchored and the first ring gear 18 is connected with the input shaft 10 to be rotated thereby, a point 1 on the axis for the first ring gear 18 and a point 0 on the axis for the second pinion carrier 30 are interconnected by a straight line. Then, the intersections of this straight line with the axes represent rotational speeds of the rotary elements of the planetary gear sets 14 and 24. In first speed, therefore, the intersection of the straight line with the axis for the first pinion carrier 20 and the second ring gear 28 represents the rotational speed of the output shaft 12. It will be appreciated that the rotational speed of the output shaft 12 is reduced as compared to the rotational speed of the input shaft 10. FIGS. 6 and 7 are nomograms for second and third speeds, respectively. It will now be readily understood from FIGS. 5, 6 and 7 that there is no rotary elements which rotates at a speed higher than the rotationed speed of the input shaft 10. FIG. 8 is a nomogram for fourth speed. In this case, since the first clutch 34 is engaged, the first sun gear 16, first ring gear 18 and first pinion carrier 20 rotate at the same speed as the input shaft 10 rotates and since the third clutch 38 is engaged, the second pinion carrier 30 rotates at the same speed as the input shaft 10 rotates. The second sun gear 26 is anchored by the first brake 42. Thus, the second ring gear 28 and the output shaft 12 rotate at a speed higher than the rotational speed of the input shaft 10, thus providing overdirve. It will be noted from FIG. 8 that there are no other rotary elements except the second ring gear 28 and the output shaft 12 which rotate at a speed higher than the input shaft 10 rotates. FIG. 9 is a nomogram for reverse drive.

In this embodiment, there is no circulation of a portion of the rotation of the input shaft 10 between the first and second planetary gear sets 14 and 24, thus causing no loss in the power transmission.

Figure 10:
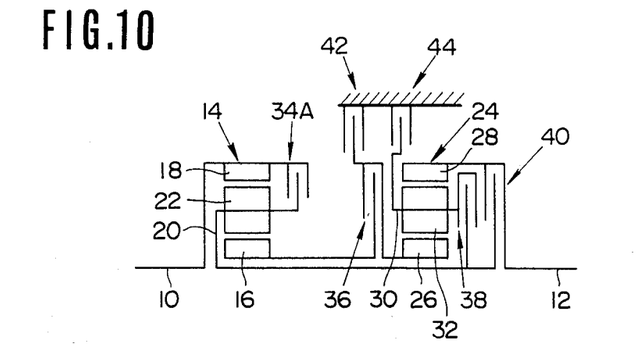
FIGS. 10 to 14 show different embodiments which are modifications of the embodiment shown in FIG. 3.

FIG. 10 shows a second embodiment. This embodiment is substantially the same as the first embodiment except the provision of a clutch 34A is place of the clutch 34. The clutch 34A is provided to selectively connect a first ring gear 18 with a first pinion carrier 20 so as to lock a first planetary gear set 14 in the same manner as the clutch 34 employed in the first embodiment.

Figure 11:
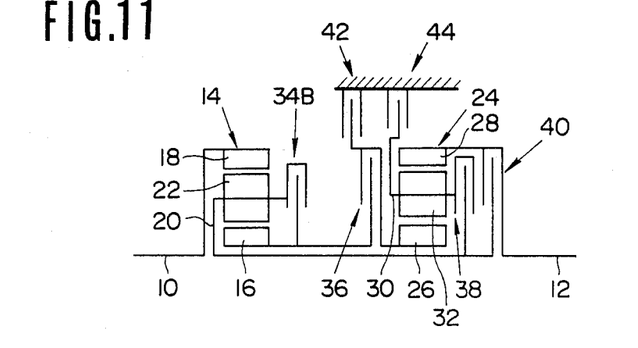

FIG. 11 shows a third embodiment. This embodiment is substantially the same as the first embodiment except the provision of a clutch 34B is place of the clutch 34. The clutch 34B is provided to selectively connect a first pinion carrier 20 with a first sun gear 16 so as to lock a first planetary gear set 14 in the same manner as the clutch 34 employed in the first embodiment.

Figure 12:
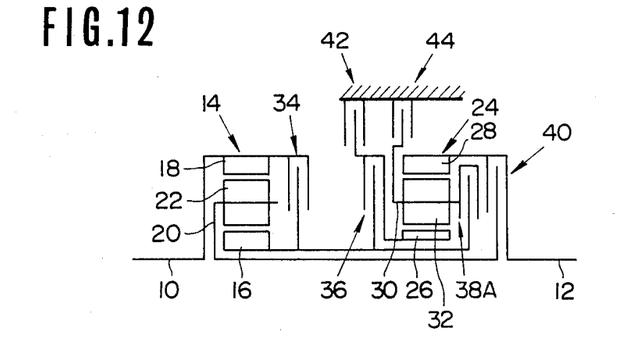

FIG. 12 shows a fourth embodiment. This embodiment is substantially the same as the first embodiment in operation although a clutch 38A is provided in place of the clutch 38 to selectively connect a second pinion carrier 30 with a first sun gear 16 of a first planetary gear set 14 rather than a first pinion carrier 20 thereof because the first planetary gear set 14 is locked during third and fourth speeds when the clutch 38A is to be engaged (ref. FIG. 4) and rotates as a unit. Since the first planetary gear set 14 rotates as a unit, a second pinion carrier 30 may be connected via a clutch with any one of the rotary elements of the first planetary gear set 14. However, it is practically impossible to arrange a clutch to selectively connect the second pinion carrier 30 with the first ring gear 18 of the first planetary gear set 14.

Figure 13:
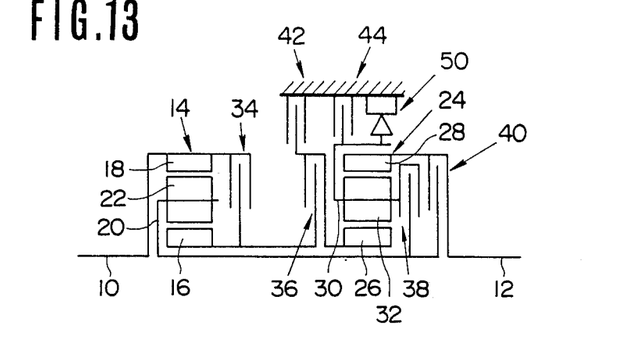

FIG. 13 shows a fifth embodiment. This embodiment is substantially the same as the first embodiment except the provision of a one-way clutch or brake 50 which prevents a second pinion carrier 30 from rotating in the reverse direction, thus serving as a complementary one-way clutch for a second brake 44. The one-way clutch 50 is connected in parallel with the second brake 44 between the second pinion carrier 30 and the transmission case. This one-way clutch 50 receives a reaction of the second pinion carrier 30 during first speed operation as long as input shaft 10 drives the gear 18 so that the application of the second brake 44 is not necessary during automatic drive range (D-range). Thus, it is easy to adjust the shift timing.

Figure 14:
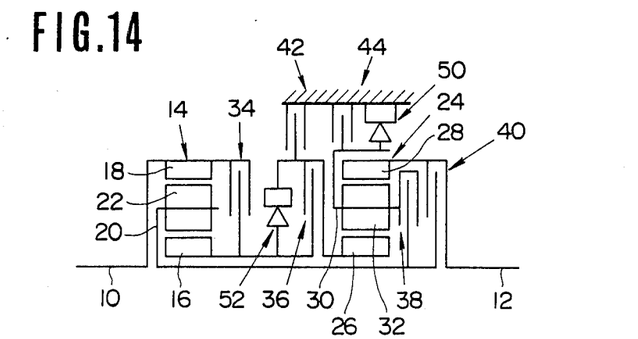

FIG. 14 shows a seventh embodiment. This embodiment is substantially the same as the fifth embodiment except the provision of a second one-way clutch 52 which connects a first sun gear 16 with a second sun gear 26 for a one-way drive. The one-way clutch 52 transmits the rotation when the input shaft 10 drives the first planetary gear set 14, thus unnecessiating the engagement of the clutch 36. Thus, it is easy to adjust the shift timing. Although, in this embodiment, the second one-way clutch 52 and the one-way clutch 50 are provided, the one-way clutch 50 may be eliminated, if desired.

Each of the preceding embodiments provides four forward speed. If desired, the number of speeds may be increased simply by combining a third planetary gear set to a second planetary gear set. This will be explained referring to FIG. 15.

Figure 15:
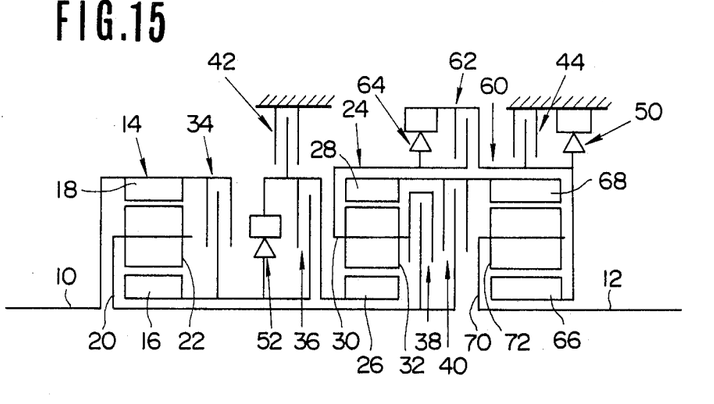
FIG. 15 shows an embodiment of a planetary gear train which is a modification of the embodiment shown in FIG. 14 in such a manner as to provide more than four forward speeds.

FIG. 15 shows an eighth embodiment. This embodiment is similar to the embodiment shown in FIG. 14 except the provision of a third planetary gear set 60 between a second ring gear 28 and an output shaft 12, and the provision of a fifth clutch 62 and its complementary one-way clutch 64 between a second pinion carrier 30 and a second brake 44. The third planetary gear set 60 includes a third sun gear 66, a ring gear 68 and a third pinion carrier 70 rotatably carrying a plurality of pinions 72 meshing with the sun and ring gears 66 and 68. The third ring gear 68 is constantly connected with a second ring gear 28. The third pinion carrier 70 is constantly connected with the output shaft 12. The third sun gear 66 is selectively anchored by the brake 44 and is prevented from rotating in the reverse direction by the one-way clutch 50. The clutch 62 selectively connects the second pinion carrier 30 with the third sun gear 66, and the one-way clutch 64 connects the second pinion carrier 30 with the third sun gear 66 for a one-way drive.

Figure 16:
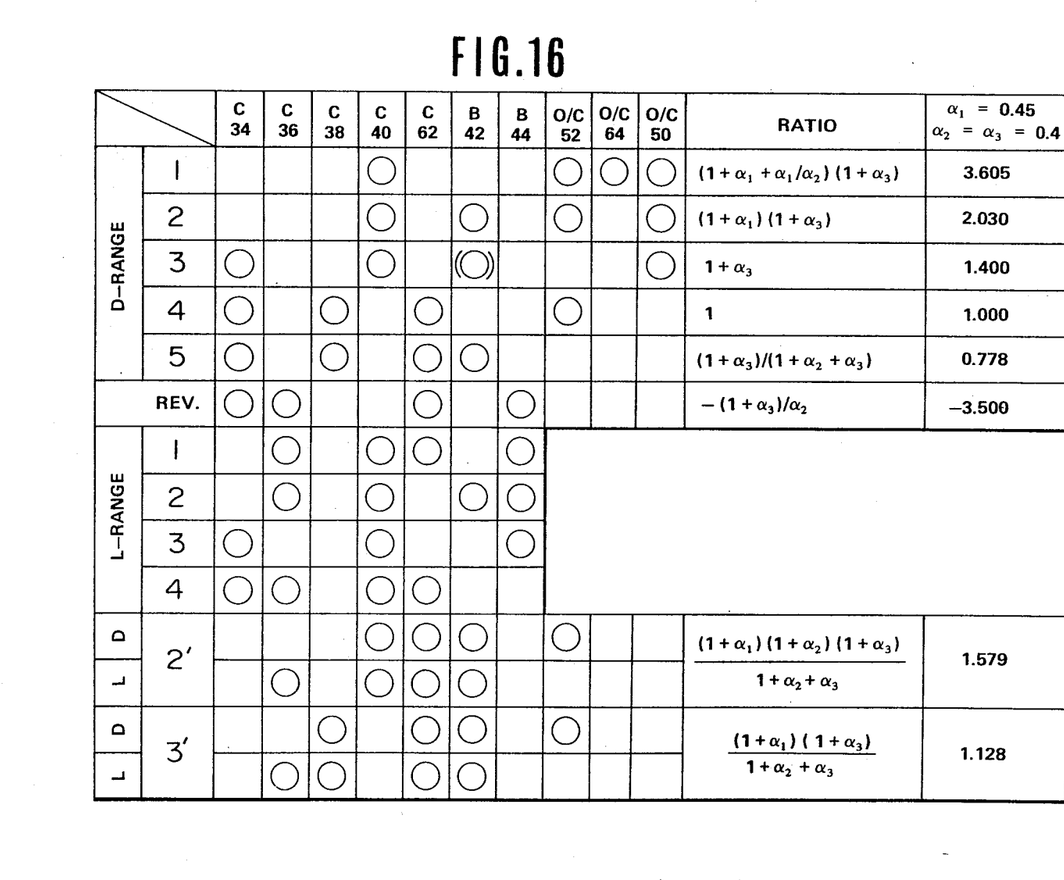
FIG. 16 is a chart showing one clutch and brake engagement-and-release pattern for the embodiment shown in FIG. 15.

The friction devices including the clutches 34, 36, 38, 40 and 62 and brake 42 and 44 are selectively engaged or released in accordance with a pattern shown in FIG. 16. With this pattern, five forward speeds are provided. Referring to FIG. 16, a ratio of the number of teeth of the third sun gear 66 to the number of teeth of the third ring gear 68 is denoted by $\alpha_3$. The corresponding gear ratios are calculated on the assumption that $\alpha_1=0.45$, $\alpha_2=\alpha_3=0.4$.

Figure 17:
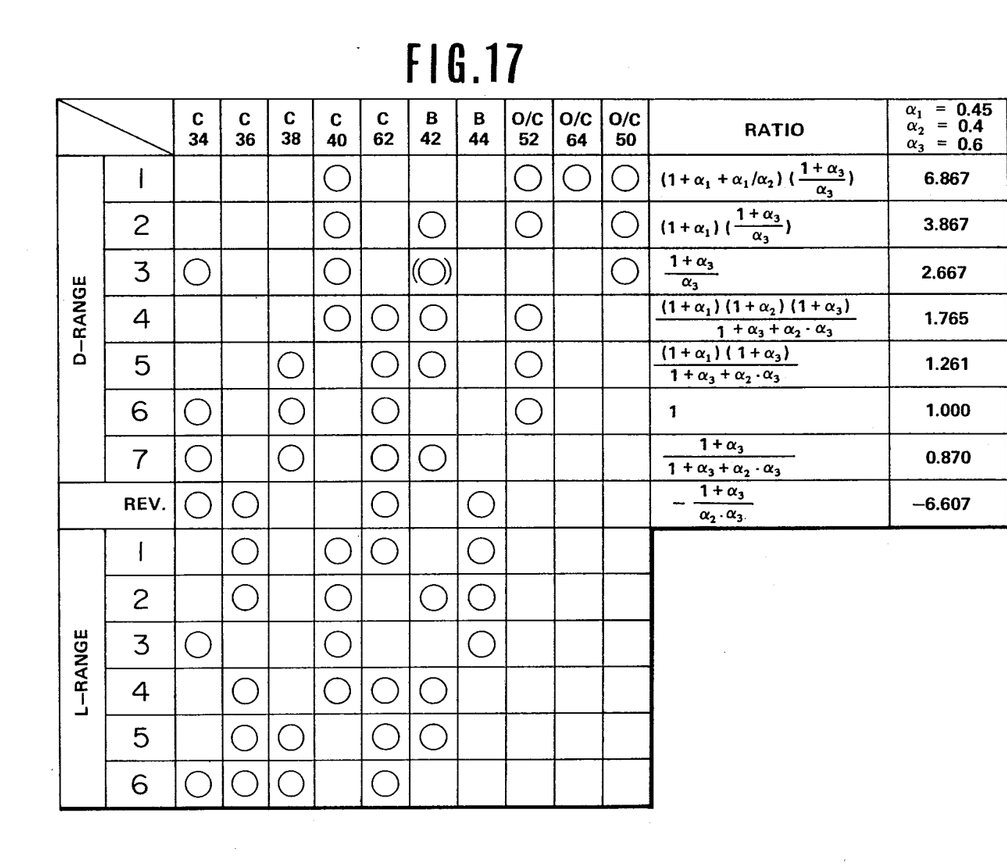
FIG. 17 is a chart showing another clutch and brake engagement-and-release pattern for the following embodiment shown in FIG. 18.
Figure 18:
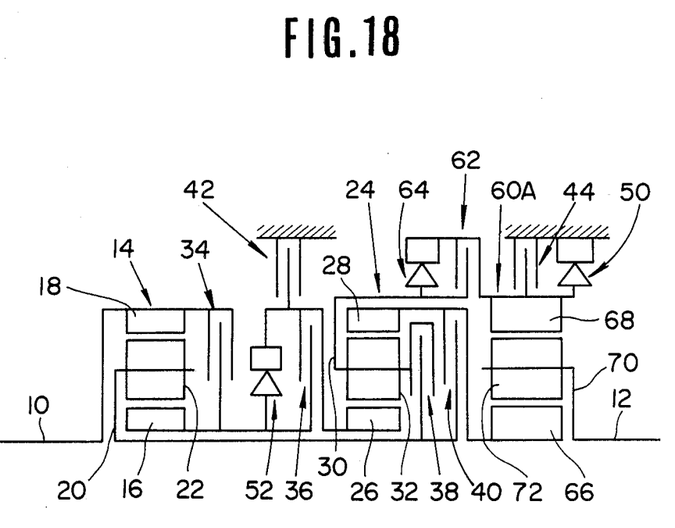
FIG. 18 shows the embodiment similar to that shown in FIG. 15.

Referring to FIGS. 17 and 18, FIG. 18 shows a ninth embodiment which is similar to the previous embodiment shown in FIG. 15 except that a third planetary gear set 60A has its sun gear 66 constantly connected with a second pinion carrier 30, and its third ring gear 68 is selectively anchored by a brake 44 and is prevented from rotating in the reverse direction by a one-way clutch 50. A fifth clutch 62 selectively connects the second pinion carrier 30 with a third ring gear 68 and its complementary one-way clutch 64 connects the second pinion carrier 30 with the third ring gear 68 for a one-way drive. The clutches and brakes of this embodiment are selectively engaged or released in accordance with a pattern shown in FIG. 17. With this pattern, seven forward speeds are provided. The corresponding gear ratios are calculated on the assumption that $\alpha_1=0.45$, $\alpha_2=0.4$ and $\alpha_3=0.6$.

What is claimed is:

1. A planetary gear train comprising:
   a first planetary gear set having rotary elements including a first sun gear, a first ring gear and a first pinion carrier rotatably supporting a plurality of first pinions meshing with said first sun gear and said first ring gear;
   a second planetary gear set having rotary elements including a second sun gear, a second ring gear and a second pinion carrier rotatably supporting a plurality of second pinions meshing with said second sun gear and said second ring gear;
   an input shaft which is always drivingly connected with said first ring gear;
   an output shaft;
   first drive connection establishing means for connecting said second ring gear with said output shaft;
   a first clutch means for selectively locking said first planetary gear set;
   second drive connection establising means for selectively interconnecting said first and second planetary gear sets, said second drive connection establishing means includes,
   a second clutch means for selectively connecting said first sun gear with said second sun gear,
   a third clutch means for selectively connecting said first planetary gear set with said second pinion carrier, and
   a fourth clutch means for selectively connecting said first pinion carrier with said second ring gear; and
   reaction providing means for selectively providing a reaction to at least one of said rotary elements.

2. A planetary gear train as claimed in claim 1, wherein said reaction providing means includes a first brake means for selectively anchoring said second sun gear, and a second brake means for selectively anchoring said second pinion carrier.

3. A planetary gear train as claimed in claim 2, wherein said first clutch means is operative to connect said first sun gear with said first ring gear.

4. A planetary gear train as claimed in claim 2, wherein said first clutch means is operative to connect said first ring gear with said first pinion carrier.

5. A planetary gear train as claimed in claim 2, wherein said first clutch means is operative to connect said first pinion carrier with said first sun gear.

6. A planetary gear set as claimed in claim 2, wherein said third clutch means is operative to connect said second pinion carrier with said first pinion carrier of said first planetary gear set.

7. A planetary gear train as claimed in claim 2, wherein said third clutch means is opearative to connect said second pinion carrier with said first sun gear of said first planetary gear set.

8. A planetary gear train as claimed in claim 2, wherein said reaction providing means includes a complementary one-way clutch means for said second brake means for preventing said second pinion carrier from rotating in a predetermined direction.

9. A planetary gear train as claimed in claim 2, wherein said second drive connection establishing means includes a one-way-clutch means for connecting said first sun gear with said second sun gear for a one-way drive.

10. A planetary gear train as claimed in claim 8, wherein said second drive connection establising means includes a one-way clutch means for connecting said first sun gear with said second sun gear for a one-way drive.

11. A planetary gear train comprising:
    a first planetary gear set having rotary elements including a first sun gear, a first ring gear and a first pinion carrier rotatably supporting a plurality of first pinions meshing with said first sun gear and said first ring gear;
    a second planetary gear set having rotary elements including a second sun gear, a second ring gear and a second pinion carrier rotatably supporting a plurality of second pinions meshing with said second sun gear and said second ring gear;
    an input shaft drivingly connected with said first ring gear;
    an output shaft;
    first drive connection establishing means for connected said second ring gear with said output shaft, said first drive connection establishing means comprising:
    a third planetary gear set including a third sun gear, a third ring gear constantly connected with said second ring gear, a third pinion carrier constantly connected with said output shaft, said third pinion carrier rotatably supporting a plurality of third pinions meshing with said third sun and ring gears; and a fifth clutch means for selectively connecting said second pinion carrier with said third sun gear;
    a first clutch means for selectively locking said first planetary gear set;

second drive connection establishing means for selectively interconnecting said first and second planetary gear sets, said second drive connection establishing means includes, a second clutch means for selectively connecting said first sun gear with said second sun gear, a third clutch means for selectively connecting said first planetary gear set with said second pinion carrier, and a fourth clutch means for selectively connecting said first pinion carrier with said second ring gear; and reaction providing means for selectively providing a reaction to at least one of said rotary elements, said reaction providing including:

a first brake means for selectively anchoring said second sun gear; and a second brake means for selectively anchoring said third sun gear.

12. A planetary gear train as claimed in claim 11, wherein said reaction providing means includes a complementary one-way clutch means for said second brake means for preventing said third sun gear from rotating in a predetermined direction.

13. A planetary gear train as claimed in claim 11, wherein said first drive connection establishing means includes a one-way clutch for connecting said second pinion carrier with said third sun gear for a one-way drive.

14. A planetary gear train as claimed in claim 12, wherein said first drive connection establishing means includes a one-way clutch means for connecting said second pinion carrier with said third sun gear for a one-way drive.

15. A planetary gear train as claimed in claim 14, wherein said second drive connection establishing means includes a one-way clutch means for connecting said first sun gear with said second sun gear for a one-way drive.

16. A planetary gear train comprising:

a first planetary gear set having rotary elements including a first sun gear, a first ring gear and a first pinion carrier rotatably supporting a plurality of first pinions meshing with said first sun gear and said first ring gear;

a second planetary gear set having rotary elements including a second sun gear, a second ring gear and a second pinion carrier rotatably supporting a plurality of second pinions meshing with said second sun gear and said second ring gear;

an input shaft drivingly-connected with said first ring gear;

an output shaft;

first drive connection establishing means for connecting said second ring gear with said output shaft; said first drive connection establishing means comprising:

a third planetary gear set including a third sun gear constantly connected with said second ring gear, a third ring gear, and a third pinion carrier constantly connected with said output shaft, said third pinion carrier rotatably supporting a plurality of third pinions meshing with said third sun and ring gears, and a fifth clutch means for selectively connecting said second pinion carrier with said third ring gear;

a first clutch means for selectively locking said first planetary gear set;

second drive connection establishing means for selectively interconnecting said first and second planetary gear sets, said second drive connection establishing means includes, a second clutch means for selectively connecting said first sun gear with said second sun gear, a third clutch means for selectively connecting said first planetary gear set with said second pinion carrier, and a fourth clutch means for selectively connecting said first pinion carrier with said second ring gear; and reaction providing means for selectively providing a reaction to at least one of said rotary elements, said reaction providing means including:

a first brake means for selectively anchoring said second sun gear; and a second brake means for selectively anchoring said third ring gear.

* * * * *